United States Patent [19]

Waymire

[11] Patent Number: 4,494,732
[45] Date of Patent: Jan. 22, 1985

[54] APPARATUS AND METHOD FOR STRINGING CENTER CABLES ON POWER TOWERS

[75] Inventor: Frank Waymire, Parker, Colo.

[73] Assignee: Union Power Construction Company, Englewood, Colo.

[21] Appl. No.: 439,655

[22] Filed: Nov. 5, 1982

[51] Int. Cl.³ ............................................ B66D 1/36
[52] U.S. Cl. ............................................ 254/134.3 R
[58] Field of Search ............... 254/134.3 R, 134.3 AA

[56] References Cited

U.S. PATENT DOCUMENTS

| | | | |
|---|---|---|---|
| 4,328,952 | 5/1982 | Chapman | 254/134.3 R |
| 4,348,009 | 9/1982 | Chapman | 254/134.3 R |
| 4,421,301 | 12/1983 | Chapman | 254/134.3 R |

Primary Examiner—Frederick R. Schmidt
Assistant Examiner—Judy J. Hartman
Attorney, Agent, or Firm—Pollock, VandeSande & Priddy

[57] ABSTRACT

A U-shaped hook device has a tensioned sock line attached to its bight portion while a helicopter haul line is removably connected to a first end of the device. The haul line is aerially pulled past a first pole of a tower until the device hooks onto the pole. The haul line is then moved to engage the second end of the device so that the haul line becomes positioned in a central opening between the first pole and a second pole. The helicopter unhooks the device from the first pole for passage through the opening thereby enabling the sock line to be mounted to an otherwise inaccessible center stringing block.

9 Claims, 6 Drawing Figures

APPARATUS AND METHOD FOR STRINGING CENTER CABLES ON POWER TOWERS

FIELD OF THE INVENTION

The present invention relates to apparatus and method for stringing power line towers and more particularly for stringing central stringing blocks in such towers.

BRIEF DESCRIPTION OF THE PRIOR ART

The prior art includes a host of tower stringing devices which are operated from ground vehicles equipped with cranes and the like. Frequently such apparatus and incident stringing methods require several ground personnel to operate equipment. In rugged mountainous terrain such apparatus is impractical. Accordingly, the more recent developments in the art have made use of helicopters for airborne stringing of power lines. A recurring problem in the use of helicopters has been the stringing of centrally located stringing blocks in tower structures where side or top access is not available.

A recent approach has been to utilize a cylindrical rod member hauled horizontally between successively placed towers by a helicopter. The rearward end of the rod member is connected to a sock line while a separate haul line extends downwardly from a helicopter for attachment to the rod member. This prior art is disclosed in U.S. Pat. Nos. 4,328,952 and 4,348,009 issued to Claude L. Chapman. In both of the mentioned patents, the rod-shaped member is needled through a central opening between laterally spaced poles of a tower until a pole catching device, connected to the rod member secures the member to one of the poles. Thereafter, the haul line is repositioned to a second coupling point and the rod member is unfastened from the pole and displaced until the pole engages a second tower catching device to permit another release of the haul line. At this point, the rod member has almost needled completely through the central opening in the tower. However, before a following tower may be strung in a similar manner, the haul line must again be attached to the first coupling point before the rod member is completely unfastened from the pole and advanced toward the following tower.

The related needle-like rod members of the mentioned patents are disadvantageously structured so that the haul line must be unduly switched between attachment points on the rod member. Operationally, this increases the time during which a helicopter must be employed for tower stringing operations thereby resulting in unnecessarily high expenses.

BRIEF DESCRIPTION OF THE PRESENT INVENTION

The present invention is directed to a generally U-shaped hook device which is attached to a tensioned sock line and a helicopter-borne haul line which guides the device and attached sock line through the central openings in power transmission towers. The device is essentially formed from a plate of steel and is characterized by a bight section for attaching the sock line, arm sections which are contoured to bear against a tower pole, and outward end sections that are fashioned in the shape of hooks to permit rapid attachment and release of a haul line. The device is structurally solid and extremely reliable. The method for using the device includes the connecting of a haul line to a first end of the device so that the device may be pulled, against the tension of a sock line, until it horizontally straddles a first pole of a tower. The haul line is then re-attached to a second device end which is located laterally inwardly of the straddled pole. Then the haul line is pulled until the device is freed from the pole thereby permitting movement of the device and attached sock line through a central opening between poles. It is not necessary to reposition the haul line relative to the device prior to the next stringing operation. The inventive method is less time consuming than that of the mentioned prior art and reduces operating expenses for construction considerably. Further, the present invention does not include separate tower-catching devices or mechanisms, as is the case with the prior art. Rather, bearing surfaces are formed in the device itself. As a result, breakage and bending of appending tower-catching devices is eliminated thus minimizing maintenance time and cost.

The above-mentioned objects and advantages of the present invention will be more clearly understood when considered in conjunction with the accompanying drawings, in which:

DETAILED DESCRIPTION OF THE INVENTION

Figure 1:
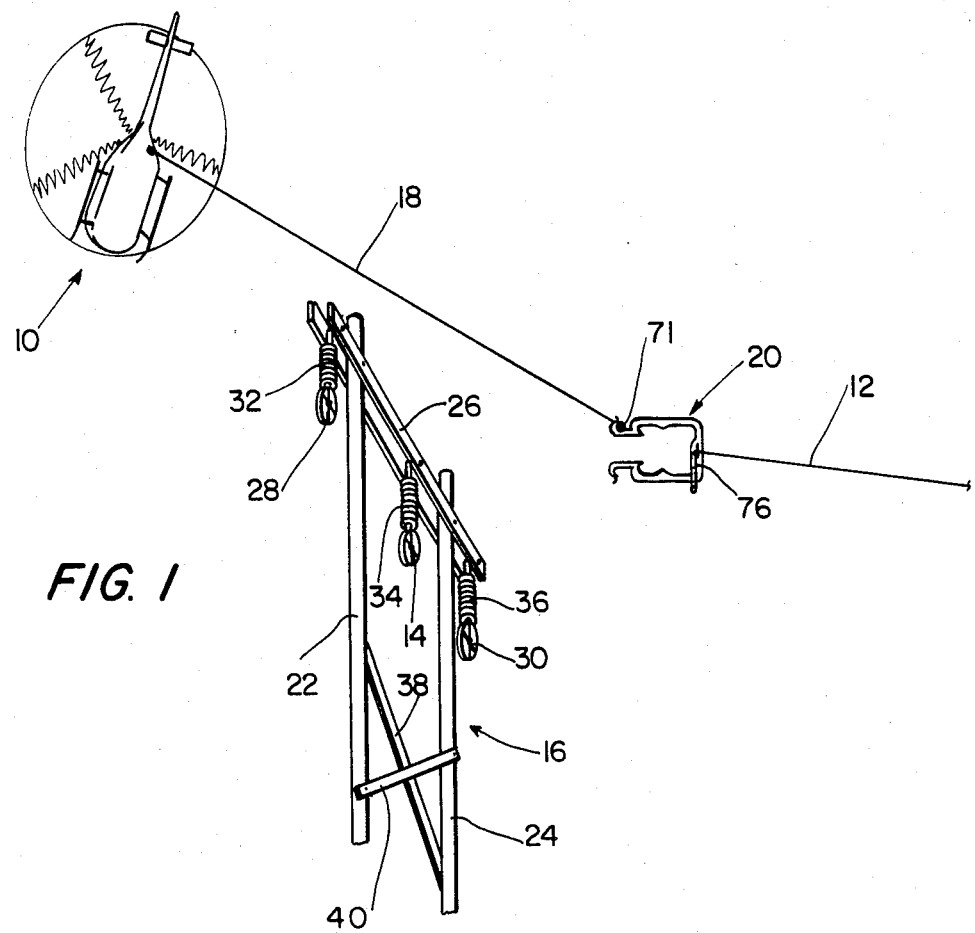
FIG. 1 is a perspective view illustrating the movement of the present invention toward a power transmission tower.

Referring to the figures and more particularly FIG. 1 thereof, the present invention is operated from helicopter 10. A sock line 12 is held in tension by conventional spool apparatus (not shown). The generally U-shaped hook-like device of the present invention is indicated by reference numeral 20 and is seen to be connected at its bight section to the free end of sock line 12. An outward end of device 20 is connected to the lower end 71 of helicopter-borne haul line 18. The purpose of the invention is to permit attachment of sock line 12 to central stringing block 14 which is inaccessibly disposed between laterally spaced tower poles 22 and 24 of power transmission tower 16. The tower construction is of a conventional type and includes a cross member 26 from which laterally outward stringing blocks 28 and 30 depend. Conventional insulators 32, 34 and 36 electrically isolate corresponding stringing blocks 28, 14 and 30 from the tower structure. Brace members 38 and 40 are attached between the poles to add structural rigidity thereto.

Figure 5:
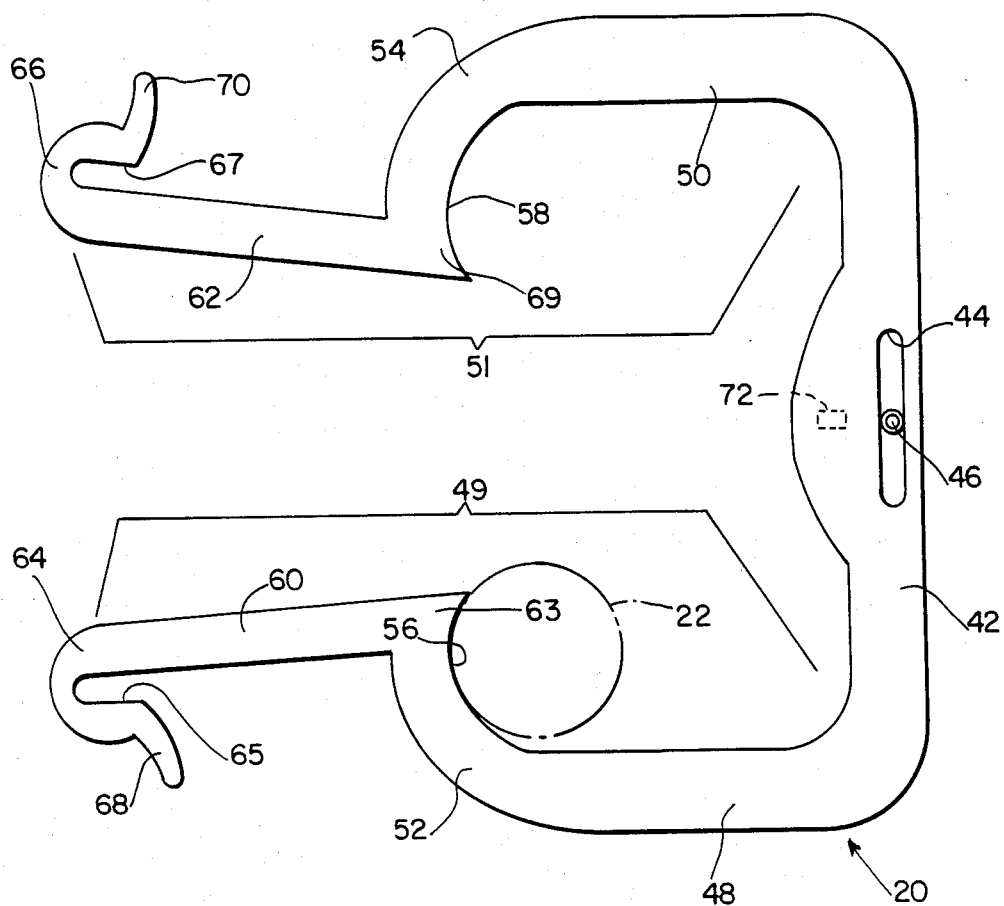
FIG. 5 is a plan view of the inventive device.

FIG. 5 illustrates the detailed structure of the device. The bight section 42 of the device is seen to include a race 44 which receives a bearing 46 therein. The bearing may be bored to receive a clevis or other suitable sock line fastener which is not illustrated in order to maximize clarity of the figure.

The bight section extends substantially perpendicularly to arm sections generally indicated by reference numerals 49 and 51. Arm section 49 is seen to include portion 48 generally perpendicular to bight section 42. Arm portion 48 then extends in a curvilinear fashion to contoured portion 52. The radially inward surface 56 of this latter portion has a radius generally compatible with the cross section of poles 22 and 24. This is desirable inasmuch as surface 58 bears against a pole during a stringing operation as will be explained hereinafter. The contoured portion 52 extends, at 63, to a straightened portion 60. The straightened portion extends generally perpendicularly to the direction of bight section 42 and terminates in a hook-shaped section 64 which generally resembles an inverted U. The opening at 65 provides a slit through which a grappling coupling 71 (FIG. 1) may be positioned. The left outward end of the device includes an outwardly flaring projection 68 which aids in guiding a device to straddle a contacted pole.

With further reference to FIG. 5, a right illustrated arm section, generally indicated by reference numeral 51, is seen to include identical portions to that just explained in connection with arm section 49. Thus, portions 50, 54, 58, 62, 66 and 70 correspond identically to portions 48, 52, 56, 60, 64 and 68. The opening 67 is illustrated as being identical to that of opening 65. Thus, as will be appreciated, the present inventive device is a symmetrical object.

Figure 2:
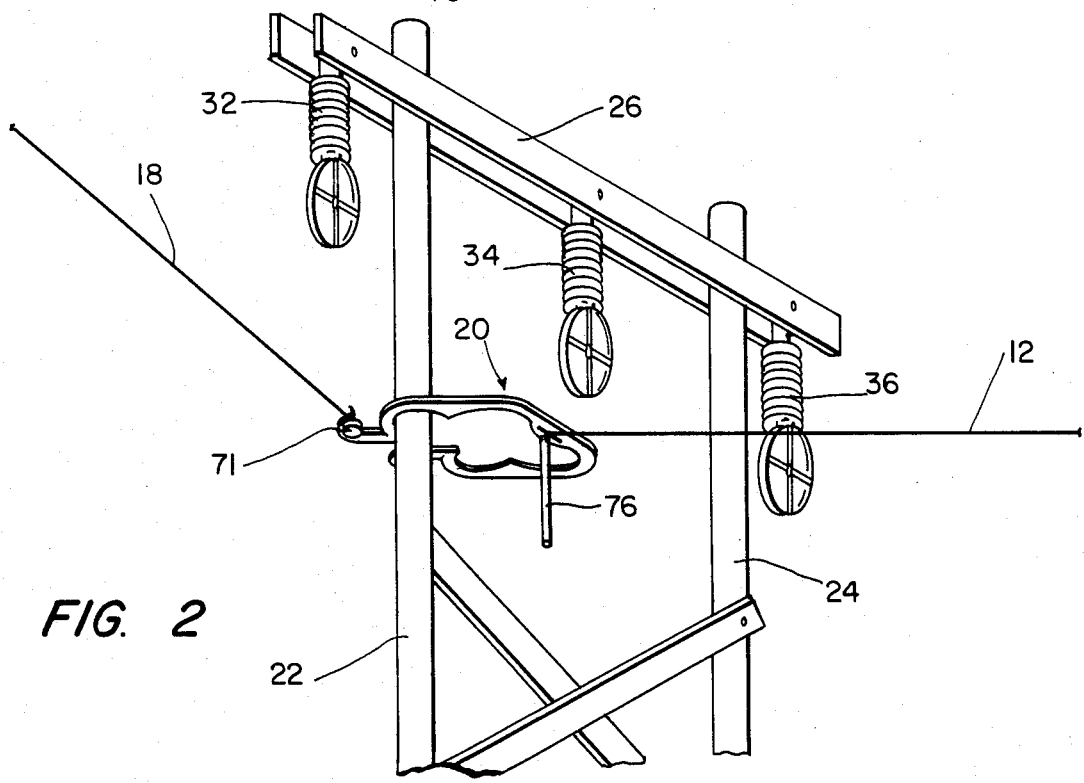
FIG. 2 is a perspective view indicating the positioning of the device onto a pole of the tower.

FIG. 2 illustrates the positioning of the inventive device on pole 22. Due to the tension on sock line 12 and the directing pulling of the device by haul line 18, the device may be horizontally positioned in a straddling relationship with pole 22 so that surface 56 (FIG. 5) bears against pole 22, as indicated by the dotted position of pole 22 in FIG. 5.

Figure 3:
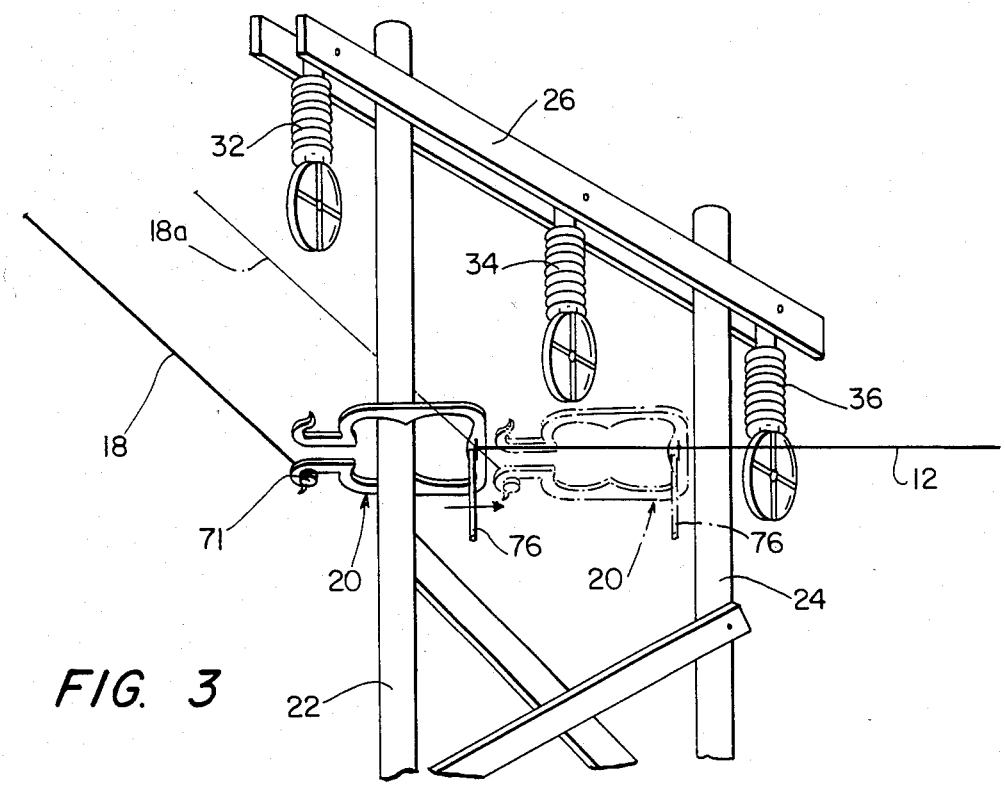
FIG. 3 is a perspective view illustrating the removal of the device from an engaged pole of the tower.
Figure 4:
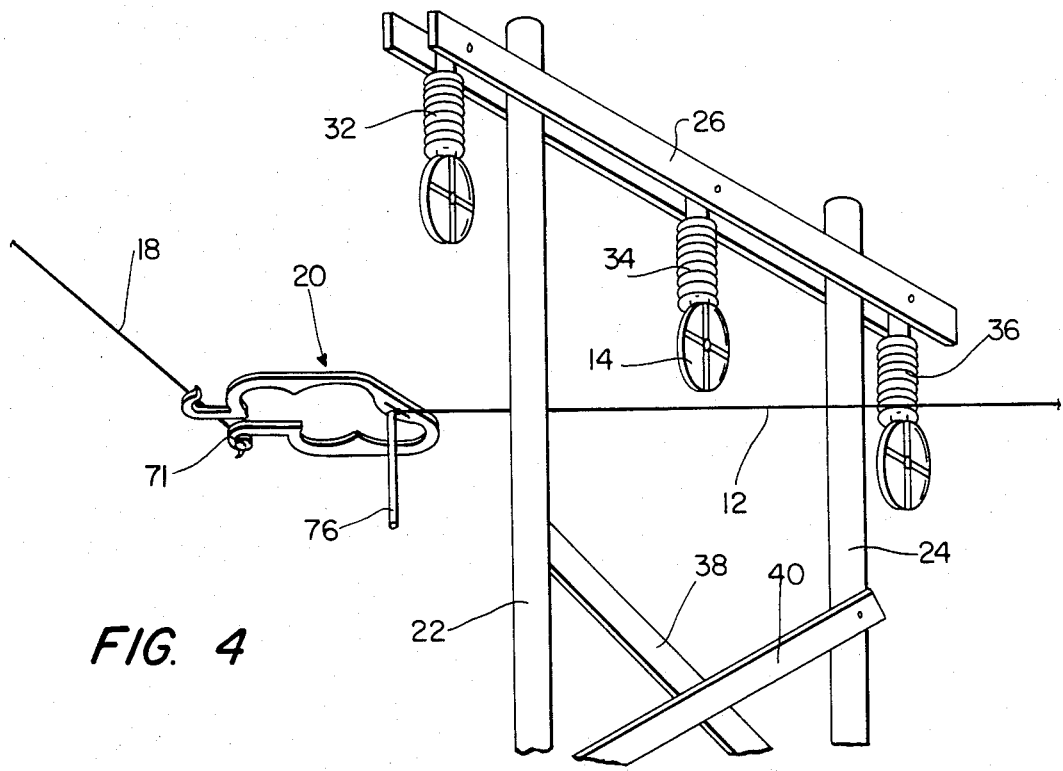
FIG. 4 is a perspective view illustrating the passage of the device and attached sock line through the central opening of the tower.

By comparing FIGS. 2 and 3, it will be noted that the haul line 18 is moved from hook-shaped section 64 to the opposite hook-shaped section 66. Then, haul line 18 is pulled until device 20 withdraws from the pole, under the urging of tensioned sock line 12. However, at this point in time, the haul line is positioned in the central opening between poles 22 and 24 as indicated by 18a in FIG. 3. Once the helicopter 10 moves forwardly toward the next tower, the device 20 and attached sock line 12 is threaded through the central opening as indicated in FIG. 4. Once the device 20 has passed through the central opening, the haul line 18 may be maneuvered to permit attachment of sock line 12 to the central stringing block 14. Once this is accomplished, the device 20 and connected haul line 18 and sock line 12 may be moved by the helicopter to a succeedingly positioned tower for stringing its central stringing block.

However, in order to repeat the procedure just explained in connection with a following tower, the device 20 must be slipped onto pole 24 of the next encountered tower whereby the engaged hook-shaped portion 66 will initially be positioned, along with haul line 18 laterally outwardly of pole 24.

Thus, by hooking the inventive device to alternating left and right poles of successively located towers, the device permits attachment of the sock line to each central block of sequentially positioned towers by a helicopter operator in a minimized number of manipulations which results in an efficient and cost-effective stringing operation.

Figure 6:
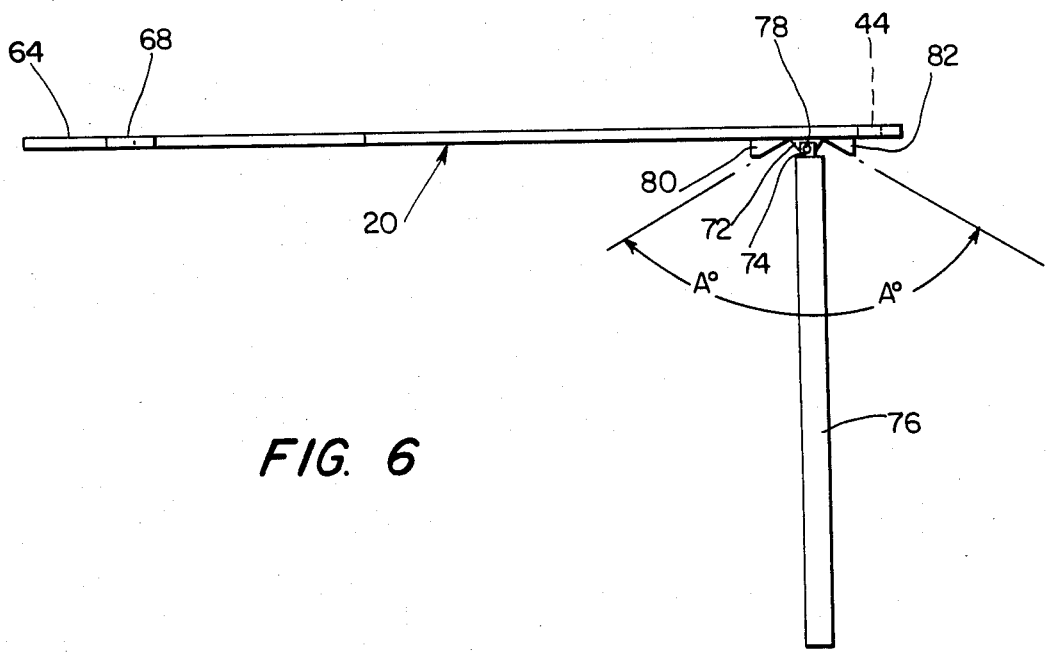
FIG. 6 is a side elevational view of the inventive device.

FIG. 6 is an elevational view of the device which shows the pivotal attachment of a stabilizer bar 76 to the bight portion for maintaining the device in a generally horizontal position to facilitate hooking of the device to a tower pole. The pivotal connection is designed to allow the stabilizer bar to pivot into contact with device 20 when a helicopter operator lowers the device to the ground. This prevents breakage of the stabilizer bar which would occur if it were rigidly attached. A truncated trapezoidal block 72 is attached to the underside of bight section 42 to receive pivot pin 78 therethrough, the pin also passing through clevis 74 which is integrally connected to stabilizer bar 76. Mechanical stops 80 and 82 are positioned forward and rearward of pivot pin 78 to limit stabilizer bar from swinging more than the indicated "A" degrees from the vertical direction. Upon lowering of the device to the ground, by a helicopter operator, the stabilizer bar 76 simply pivots toward the main body of the device until it engages one or the other of the mechanical stops 80, 82. Besides preventing damage to the stabilizer bar, the pivot permits realization of a compact package for the inventive device when it is handled on the ground.

It should be understood that the invention is not limited to the exact details of construction shown and described herein for obvious modifications will occur to persons skilled in the art.

We claim:

1. A generally U-shaped hook device for stringing cables on sequentially spaced support towers, each having corresponding first and second laterally spaced poles, the device comprising:

a bight section, arm sections and end sections;

means for connecting a tensioned sock line to the bight section;

first line securement means located in a first end section for positioning a haul line laterally outwardly of a tower as the device is pulled to horizontally straddle the first pole;

first means located along a first arm section for bearing against the first pole while the device is straddled thereacross thereby hooking the device to the pole;

second line securement means located in a second end section receiving the haul line after its release from the first end section for enabling the device to be slipped off the first pole and passed between the poles for repeated retention to a second pole of a following tower; and second bearing means located along a second arm section for bearing against a pole of a following tower.

2. The subject matter set forth in claim 1 wherein each line securement means comprises a hook-shaped portion contiguous with each arm section.

3. The subject matter of claim 1 wherein the sock line connecting means comprises:

a race formed in the bight section;

a bearing located in the race; and means attached to the bearing for connecting the sock line thereto.

4. The structure set forth in claim 1 wherein the end sections include means flared outwardly from the arm sections for guiding the device into hooking engagement with a pole.

5. The subject matter set forth in claim 1 wherein each line securement means comprises a hook-shaped portion contiguous with each arm section, and further wherein the sock line connecting means comprises:

a race;

a bearing; and means attached to the bearing for connecting the sock line thereto; and still further wherein each bearing means formed in the arm sections include a surface contoured to mate with the pole.

6. The structure set forth in claim 5 and further wherein the end sections include means flared outwardly from the arm sections for guiding the device into hooking engagement with a pole.

7. The structure set forth in claim 6 together with means pivotally connected to the device for stabilizing the device in a plane generally perpendicular to the poles thereby implifying the hooking of the device to a pole.

8. A method for stringing center cables between laterally spaced first and second poles of a support tower comprising the steps:

connecting a tensioned sock line to a bight section of a generally U-shaped hook device;
 connecting a first end of the device to a haul line;
 pulling the first end of the device from an elevated location until it horizontally straddles a first pole;
 releasing the haul line from the device while it continues to straddle the first pole under tension from the sock line;
 re-attaching the haul line to a second end of the device which is located laterally inwardly of the first pole; and
 pulling the haul line until the device is freed from the first pole thereby permitting movement of the device and attached sock line between the first and second poles to a following tower.

9. The method set forth in claim 8 together with the steps:

pulling the second end of the device from an elevated location until it horizontally straddles a second pole of the following tower;
 releasing the haul line from the device;
 re-attaching the haul line to the first end of the device which is now located laterally inwardly of the second pole; and
 pulling the haul line until the device is freed from the second pole thereby permitting movement of the device and attached sock line between the poles for advancement to yet another tower.

* * * * *